United States Patent
Hackett-Jones et al.

(10) Patent No.: US 10,235,443 B2
(45) Date of Patent: Mar. 19, 2019

(54) PARAMETER SET DETERMINATION FOR CLUSTERING OF DATASETS

(71) Applicant: ACCENTURE GLOBAL SOLUTIONS LIMITED, Dublin (IE)

(72) Inventors: Emily Hackett-Jones, St Peters (AU); Theam Yong Chew, Christchurch (NZ); Stephen Kirkby, Unley Park (AU); Rob Pallotta, Adelaide (AU); Katherine Enderling, Burnside (AU)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 391 days.

(21) Appl. No.: 15/057,857

(22) Filed: Mar. 1, 2016

(65) Prior Publication Data
US 2017/0255688 A1 Sep. 7, 2017

(51) Int. Cl.
| G06F 7/00 | (2006.01) |
| G06F 17/30 | (2006.01) |
| G06N 3/12 | (2006.01) |
| G06N 99/00 | (2019.01) |

(52) U.S. Cl.
CPC ....... *G06F 17/30598* (2013.01); *G06N 3/126* (2013.01); *G06N 99/005* (2013.01)

(58) Field of Classification Search
CPC . G06N 99/005; G06N 3/126; G06F 17/30598
See application file for complete search history.

(56) References Cited

U.S. PATENT DOCUMENTS

| 5,222,192 A * | 6/1993 | Shaefer | G06N 3/126 706/13 |
| 5,255,345 A * | 10/1993 | Shaefer | G06Q 10/04 706/13 |
| 5,933,818 A * | 8/1999 | Kasravi | G06K 9/622 706/12 |
| 6,633,882 B1 * | 10/2003 | Fayyad | G06F 17/30592 |
| 10,068,174 B2 * | 9/2018 | Aili | G06N 5/022 |
| 2005/0047270 A1 * | 3/2005 | Wood | A01K 63/042 366/170.3 |
| 2005/0177351 A1 * | 8/2005 | Goldberg | G06K 9/6218 703/1 |

(Continued)

FOREIGN PATENT DOCUMENTS

WO 2015/184729 12/2015

OTHER PUBLICATIONS

Whitley, "A Genetic Algorithm Tutorial", Computer Science Department, Colorado State University, 1994, 37 pages.

(Continued)

*Primary Examiner* — Hasanul Mobin
(74) *Attorney, Agent, or Firm* — Mannava & Kang, P.C.

(57) ABSTRACT

A clustering system selects a parameter set from a plurality of parameter sets associated with a dataset to generate a hyper-optimized cluster of the dataset. Different parameter sets are generated by varying the parameter values based on the Genetic Algorithm or a particle swarming algorithm. A parameter set having a high Fitness score is selected from the different parameter sets and a clustered solution produced using the selected parameter set having a maximum total score is used to produce actionable items.

12 Claims, 9 Drawing Sheets

(56) References Cited

U.S. PATENT DOCUMENTS

| | | | | |
|---|---|---|---|---|
| 2013/0073490 A1* | 3/2013 | Baughman | ............ | G06N 3/126 |
| | | | | 706/13 |
| 2014/0156570 A1* | 6/2014 | Randerath | ............ | G05B 23/024 |
| | | | | 706/12 |
| 2014/0358831 A1* | 12/2014 | Adams | ................. | G06N 7/005 |
| | | | | 706/12 |
| 2015/0317589 A1* | 11/2015 | Anderson | ............. | G06Q 10/08 |
| | | | | 705/7.25 |
| 2016/0026625 A1* | 1/2016 | Walker | ............... | G06F 17/3002 |
| | | | | 707/737 |
| 2017/0083826 A1* | 3/2017 | Kisilev | ............... | G06N 99/005 |

OTHER PUBLICATIONS

Yang et al., "A Framework for Self-Tuning Optimization Algorithm", Neural Computing and Applications, col. 23, No. 7-8, pp. 2051-2057, (2013), 24 pages.

"Parameter estimation using grid search with cross-validation—scikit-learn 0.17", Retrieved from internet on Aug. 18, 2017, 2 pages. <URL:http://web.archive.org/web/20160220205247/http://scikit-learn.org/stable/auto_examples/model_selection/grid_search_digits.html> published on Feb. 20, 2016 as per Wayback Machine.

Thornton, C. et al., 'Auto-WEKA: Combined Selection and Hyperparameter Optimization of Classification Algorithms', CoRR, Mar. 6, 2013, 9 pages.

* cited by examiner

700

| Name | Type | DefaultValue | MinimumOrValues | MinInclusive | MaximumValue | MaxInclusive |
|---|---|---|---|---|---|---|
| grasp_sa_option | logical | TRUE | | | | |
| grasp_sa_temp | double | 0.25 | 0 | FALSE | 100 | |
| grasp_search | character | WgtRandom | Random;WgtRandom;Wgt | | | |
| grasp_start | character | Random | Random;WgtRandom;Wgt | | | |
| imprv_limit | integer | 30 | 0 | FALSE | 100 | |
| cluster_number | integer | 3 | 2 | FALSE | 20 | |
| max_dist_limit | double | 1 | 0.5 | TRUE | 1 | TRUE |
| max_ss | double | 0.4 | 0 | FALSE | 1 | TRUE |
| max_vars | integer | 10 | 4 | FALSE | 30 | |
| min_ss | double | 0.02 | 0 | TRUE | max_ss | TRUE |
| min_vars | integer | 5 | 2 | FALSE | max_vars-2 | |
| avg_centroid_dist_limit | double | 1 | 0 | TRUE | max_dist_limit | FALSE |
| categ_dist | double | 1 | 0 | TRUE | 100 | |
| centroid_weight | double | 1 | 0 | TRUE | 100 | |
| obj_type | character | Euclidean | Euclidean;MaxVar;MaxRange;MaxAbsMin | | | |
| obj_weight | double | 1 | 0 | TRUE | 100 | |
| overlap_factor | double | 0.05 | 0 | TRUE | 1 | TRUE |
| overlap_limit | double | 0.2 | 0 | TRUE | 1 | TRUE |
| overlap_mode | character | Mult | Add;Mult | | | |
| overlap_penalty_amount | double | 0.05 | 0 | TRUE | 1 | FALSE |
| soln_div_type | character | Euclidean | Euclidean;MaxVar;MaxRange;MaxAbsMin | | | |
| soln_div_weight | double | 1 | 0 | TRUE | 100 | |
| ss_filter | logical | TRUE | | | | |
| ss_mode | character | Mult | Add;Mult | | | |
| ss_penalty_amount | double | 0.05 | 0 | TRUE | 1 | FALSE |

FIG. 7

PARAMETER SET DETERMINATION FOR CLUSTERING OF DATASETS

BACKGROUND

Big data is a broad term for data sets that are large and/or complex, and often traditional data processing applications are inadequate for processing the data sets. Challenges often include analysis, capture, data curation, search, sharing, storage, transfer, visualization, querying, etc. Analyzing the large data sets may be important for numerous software applications. One general approach to analyzing datasets, called clustering, involves segmenting the data into groups, or clusters, based on similarities and differences within the data.

BRIEF DESCRIPTION OF DRAWINGS

The embodiments are described in detail in the following description with reference to the following figures. The figures illustrate examples of the embodiments.

FIG. 7 illustrates an example of the parameters used in a clustering engine.

DETAILED DESCRIPTION OF EMBODIMENTS

Figure 1:
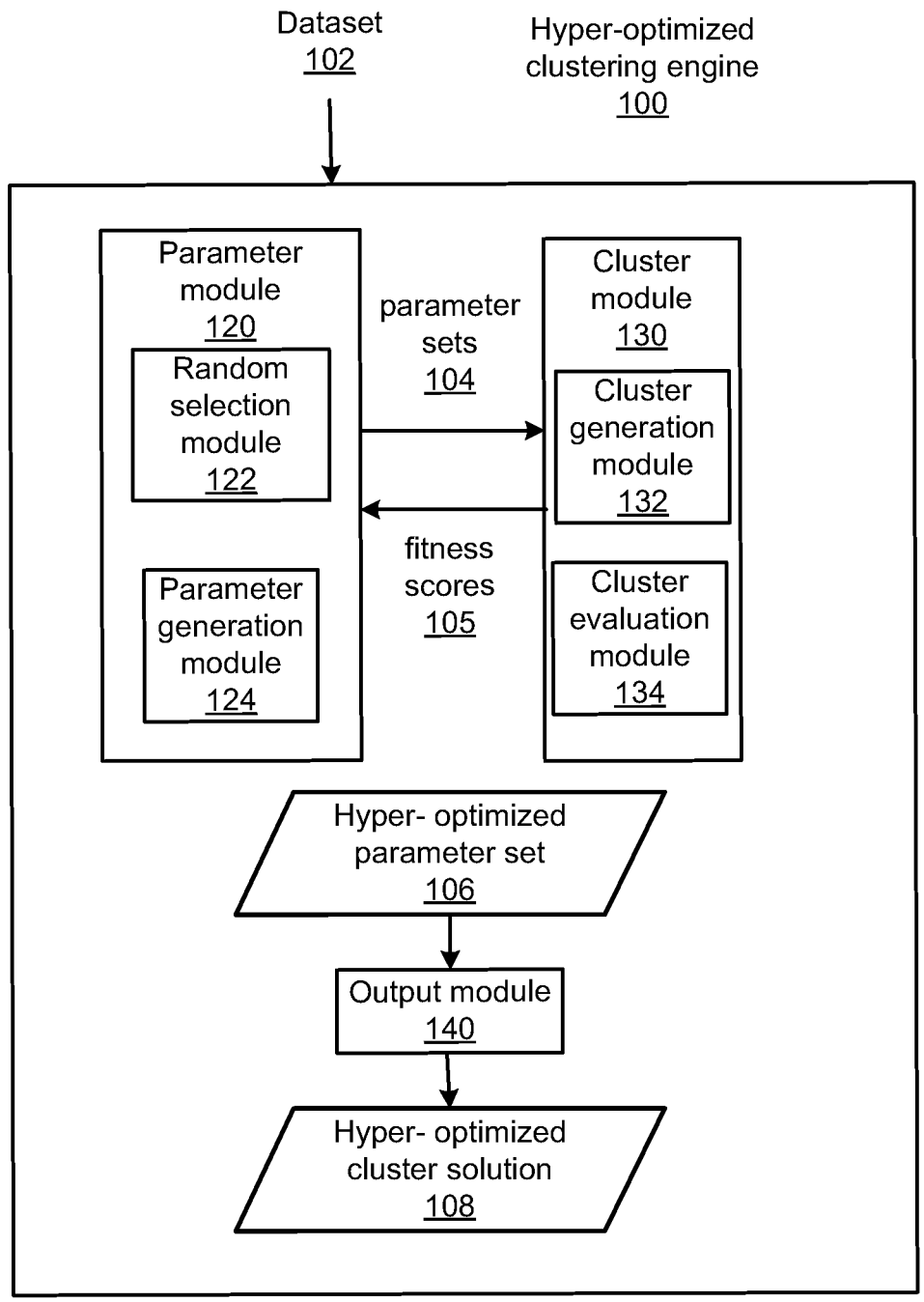
FIG. 1 illustrates one example of a hyper-optimized cluster system.

For simplicity and illustrative purposes, the embodiments of the invention are described by referring mainly to examples thereof. Also, numerous specific details are set forth in order to provide a thorough understanding of the embodiments. It will be apparent however, to one of ordinary skill in the art, that the embodiments may be practiced without limitation to one or more of these specific details. In some instances, well known methods and structures have not been described in detail so as not to unnecessarily obscure the description of the present disclosure. In the present disclosure, the term "includes" means includes but not limited thereto, the term "including" means including but not limited thereto. The term "based on" means based at least in part on. In addition, the terms "a" and "an" are intended to denote at least one of a particular element.

For large amounts of data with many different characteristics, there may be a number of different ways to segment the data into clusters. For example, there may be many different potential groupings for a particular population of people (e.g., customers of a company) each having a plurality of attributes (e.g., customer status (active, inactive, etc.), address (e.g., grouping by state), etc.). Furthermore, as quantities of data with significant breadth (e.g., variation in attributes collected about each individual customer) are collected and stored, finding meaningful groupings in the data may become time-consuming. In addition, different clustering algorithms (e.g., K-means Clustering, Expectation-Maximization (EM) Clustering, Hierarchical Clustering, etc.) may produce different groupings. In such scenarios, determining which clustering technique yields the most meaningful group of clusters may be difficult.

As a particular example, a clustering algorithm known as the k-means algorithm takes as input a data set, as well as a selection of variables and a target number of clusters, and returns a grouping of the data set based on the characteristics of those variables. The number of possible clustering results generated by the k-means algorithm may be large, and evaluating the results to determine the most appropriate grouping may be difficult. For example, if a data set to input into the k-means algorithm has 5 variables out of 75 potential variables to choose from, there are 17,259,390 possible clustering results to evaluate. As another example, if the total number of available variables increases to 150 (i.e., twice as many options), the potential cluster set increases to 591,600,030 (i.e., by a factor of over 34.) In some scenarios, it is not uncommon to have upwards of 200 or more available variables to choose from.

Therefore, even if a user utilizes clustering algorithms (as well as software packages that implement these algorithms) to discover clusters within data, the user may still face some daunting tasks, such as coordinating the mass application and evaluation of these algorithms across a large space of possible clusters. Typically, such tasks are performed in an ad hoc fashion, resulting in inefficient work and often ineffective solutions.

Moreover, to begin a single run of a clustering engine, a large number of parameters need to be configured. While this can make the clustering engine highly configurable in terms of how it performs the clustering, configuring the parameters is a time consuming process carried out generally by experts. At the beginning of the run, many parameters are set to their default values and it can be difficult to estimate what the results would be if the parameters are changed. For example, in many instances the number of clusters that are desired to be generated are restricted between min_cluster and max_cluster parameters. As another example, the number of cluster variables or clustering dimensions are also bounded by the min_vars and max_vars parameters. However, the best values for these parameters are not usually clear from the datasets. In view of the foregoing, embodiments are disclosed herein for a hyper-optimized clustering engine that optimizes a clustering cycle. The hyper-optimized clustering engine not only optimizes the clusters but also optimizes values of the parameters that are applied to generate the clusters. Hence, the clusters in the correct parameter space can be further investigated thereby producing superior cluster solutions.

According to an embodiment, a hyper-optimized clustering engine is disclosed which optimizes the cluster generation process via initially generating an optimized parameter set and further via evaluation of the generated clusters to select a most optimized cluster solution for a given dataset. A cluster solution when implemented on the dataset, enables assigning each item in the data set to particular clusters. Hence, a plurality of clusters corresponding to a clustered dataset is generated from each cluster solution that is applied to the dataset. The hyper-optimized clustering engine initially generates a plurality of parameter sets whose values are randomly selected. A plurality of cluster solutions are generated from each of the initial parameter sets. The goodness of each cluster solution is measured using a respective total score. The total score may be calculated as the sum of a business value score, a solution diversity score and an average centroid distance score for each cluster. The details of each of these scores will be discussed further infra. A fitness score for each of the initial parameter sets is calculated based on the total scores of respective cluster solutions. A subset of the initial parameter sets with high fitness scores are selected for further iterations.

To determine the optimized parameter set, various computational techniques, such as but not limited to a Genetic Algorithm (GA) or a Particle Swarm Optimization (PSO) algorithm, may be employed to iteratively generate further parameter sets from the selected initial parameter sets. In the context of applying the GA in the hyper-optimized cluster engine, a chromosome is a set of parameters $P_i$ satisfying the parameter specification bounds and the GA produces the next generation of parameter sets by applying the mutation and crossover operators on the selected initial parameter sets. For PSO, a population of candidate solutions are generated. The population is referred to as a swarm and the candidate solutions are referred to as particles. The PSO solves a problem by moving particles in a search-space according to formulae and parameters. The movements of the particles are guided by their own best known position in the search-space as well as the entire swarm's best known position. When improved positions are discovered, these positions then guide the movements of the swarm toward the best solutions. The firefly algorithm is an example of a PSO that can be employed to generate further parameter sets in the hyper-optimized cluster engine, wherein each parameter set is considered to be a firefly with a brightness that corresponds to the fitness score. Distance, movement and perturbation operators are applied to the initial selected parameter sets to iteratively generate further parameter sets. For each of the further parameter sets, the corresponding cluster solutions are generated and their total scores determined from which the fitness scores of the parameter sets are calculated. A subset of the further parameter sets with high fitness scores are again selected for the next iteration. The iterations are thus continued until the condition to exit the iterations is achieved. In an embodiment, the iterations can be stopped if a certain predetermined high fitness score is achieved by a predetermined minimum number of parameter sets. Upon exiting the iterations, a final parameter set with the highest fitness score is selected for the cluster generation. A plurality of cluster solutions are generated from the selected final parameter set and their total scores are evaluated for selecting a most optimized cluster solution to be applied to the dataset. The clustered datasets generated using such hyper-optimized parameter sets can be used in systems such as but not limited to commercial applications, healthcare applications, etc.

FIG. 1 shows a hyper-optimized clustering engine 100 according to one embodiment. The hyper-optimized clustering engine 100 comprises a parameter module 120, a cluster module 130 and an output module 140. The parameter module 120 and the cluster module 130 are configured to generate and evaluate various parameter sets and select the best parameter set to use for a given dataset 102. Upon identifying a parameter set to be used for the clustering, the dataset 102 is clustered and the output module 140 uses the clustered data set corresponding to the hyper-optimized cluster solution 108 in an external application. Therefore, it can be appreciated that the output module 140 is optionally included and that hyper-optimized clustering engine 100 can be configured with just the parameter module 120 and the cluster module 130 wherein the output module 140 may be part of an external system disparate from the hyper-optimized clustering engine 100.

A random selection module 122 included in the parameter module 120, generates the initial pool of the parameter sets via random selection. The pool of parameter sets $P=\{P_1, P_2, P_3, \ldots\}$ that are initially generated are gradually improved over time through iterative techniques. Parameter sets 104, including an initial pool of parameter sets, $P=\{P_1, P_2, P_3, \ldots\}$ are transmitted to the cluster module 130. For each parameter set $P_i$ in the pool, the cluster generation module 132 generates a plurality of cluster solutions so that each cluster solution corresponds to a sequence of clusters or a clustered dataset. Sequences of clustered datasets corresponding to each of the parameter sets $P_i$ are thus obtained.

A cluster evaluation module 134 evaluates each of the clustered datasets to assign each clustered dataset a total score which will be detailed further herein. Not all the clustered datasets are accepted by the cluster module 130. Rather, a subset of the clustered datasets with sufficiently high total scores can be stored in a temporary data storage (not shown) for further processing. A single fitness score is further obtained for each parameter set $P_i$ respectively (shown as fitness scores 105) based on the total scores of the clustered datasets generated from the parameter set $P_i$. For example, each total score can be compared to a predetermined threshold value. Only those clustered datasets whose total scores exceed the predetermined threshold value may be stored while those clustered datasets that do not meet the predetermined threshold value can be discarded.

A parameter generation module 124 is also included in the parameter module 120 for generating further parameter sets for evaluation and selection by the cluster module 130. The parameter generation module 124 iteratively generates further parameter sets from the initial parameter sets 104. In one example, the parameter generation module 124 can employ computational techniques such as the genetic algorithm (GA) for generating further parameter sets as it iterates over prior parameter sets. In one example, the parameter generation module 124 can employ the firefly algorithm or other PSO techniques for generating the further parameter sets from the prior parameter sets. The various parameter sets thus generated are again evaluated based on their Fitness scores as described above. The generation of parameter sets can be continued as the Fitness scores rise and halted when the Fitness scores stabilize. A hyper optimized parameter set 106 is selected that has a high, stable fitness score.

The output module 140 receives the hyper-optimized parameter set 106 and employs it for driving clustering systems. For example, the output module 140 can be configured for analyzing various types of datasets, clustering them to output a hyper-optimized cluster solution 108 which can be further employed for identifying other actionable items. An actionable item or an output of an actionable item may be control of an external system based on the hyper-optimized cluster solution 108. For example, a hyper-optimized cluster solution 108 may be analyzed to identify combinations of attributes associated with the data items in each cluster of the hyper-optimized cluster solution 108. Based on these combinations, control of an external system may be performed, such as described by way of example with respect to FIGS. 8 and 9. Similarly, the output module 140 can pertain to different domains such as but not limited to, healthcare or other data domains where it aids in the analysis of large scale datasets. Further examples will be discussed in detail with reference to FIGS. 7 and 8 for example.

As mentioned above, the hyper-optimized clustering engine 100 can use the GA or the firefly algorithm for processing the parameter sets in order to identify the best parameter set for clustering the dataset 102. Conventional genetic algorithm problems generally deal with Boolean values. However, the parameters associated with the dataset 102 may include not only Boolean values but also numeric and categorical values. Moreover, each parameter often has additional constraints defining its valid bounds. With modifications described herein, a modified GA can be used in the hyper-optimized clustering engine 100.

GA usually begins with a random population of chromosomes where each chromosome is represented as a bit-string or as a sequence of fixed set of symbols. As indicated above, for the hyper-optimized cluster engine 100, a chromosome is a set of parameters $P_i$ satisfying the parameter specification bounds. In the initialization phase as executed by the random selection module 122, a chromosome is generated by randomly sampling values for each parameter with values that depend on its type. Numeric values are sampled from a uniform distribution lying between the parameters' minimum to maximum limits. Categorical and Boolean variables are initialized by randomly sampling their possible values assigning equal probability to each value.

Figure 2:
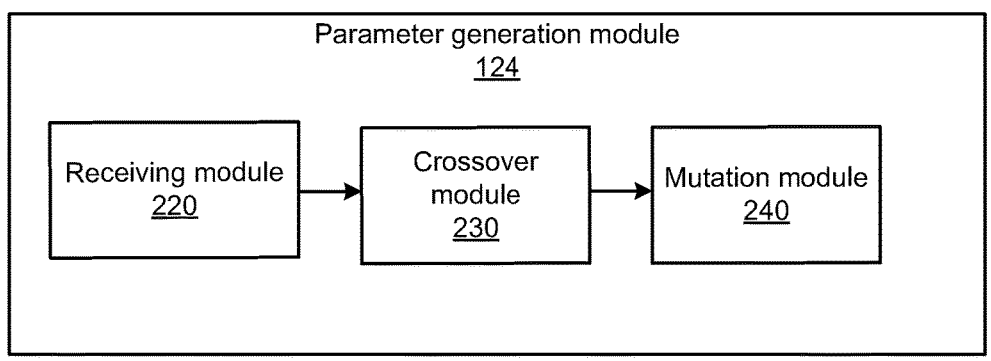
FIG. 2 illustrates one example of a parameter generation module.

FIG. 2 is a schematic diagram of one example of the parameter generation module 124 which employs the GA for generating parameter sets. The parameter generation module 124 comprises a receiving module 220 for receiving the initial parameter sets 104 produced by the random selection module 122 in the initialization phase. The "search" operators include mutation and crossover operators for creating new chromosomes based on the existing fittest chromosomes. Accordingly, a crossover module 230 and a mutation module 240 are included in the parameter generation module 124 to implement the mutation and crossover functions respectively.

The crossover module 230 can implement the crossover procedure in several variations. In one example, the crossover module 230 swaps subsequences between chromosomes. The crossover module 230 swaps the parameters of two chromosomes (or parameter sets) after some randomly chosen point. The mutation module 240 can implement a random change in symbols or parameter values at some random location in a cluster. For numeric parameters, the mutation module 240 may perturb the parameter value by a random change of about 5% but other percentages may be used. Categorical parameters are resampled while Boolean parameters are toggled by the mutation module 240. The parameter sets thus processed by the crossover module 230 and the mutation module 240 are transmitted to the cluster module 130 for determination of their genetic health, such as determination of the Fitness score.

Figure 3:
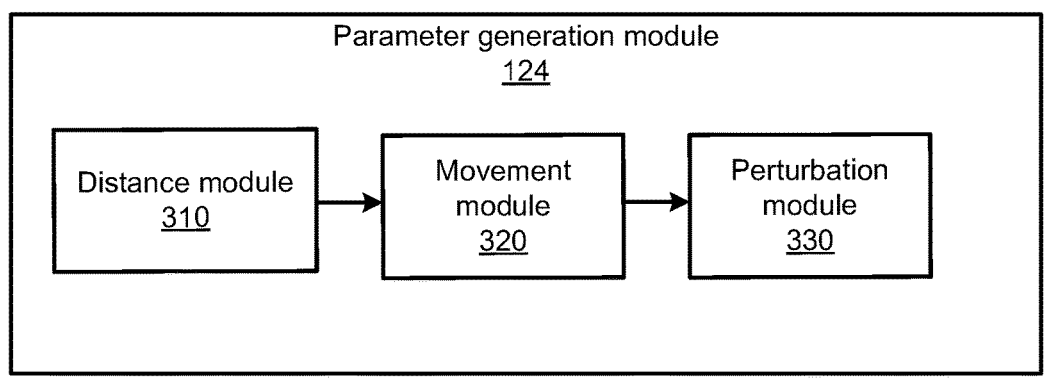
FIG. 3 illustrates one example of a parameter generation module.

The Fitness score can also be used to apply particle swarm optimization algorithms (such as the firefly algorithm) to the parameters. FIG. 3 shows another example of the parameter generation module 124 which employs the firefly algorithm for generating parameter sets. In this case, the distance module 310, the movement module 320 and the perturbation module 330 extend the natural operations of the particle swarm algorithm to parameter sets $P_i$ of the hyper-optimized clustering engine 100. For numeric parameters in $P_i$, the movement rules may include using Euclidean vector distance between parameters for the distance. Vector subtraction and perturbation operators are used to move to generate a new parameter set. Categorical distances are defined based on equality of values, with non-equal values being equidistant from each other.

Figure 4:
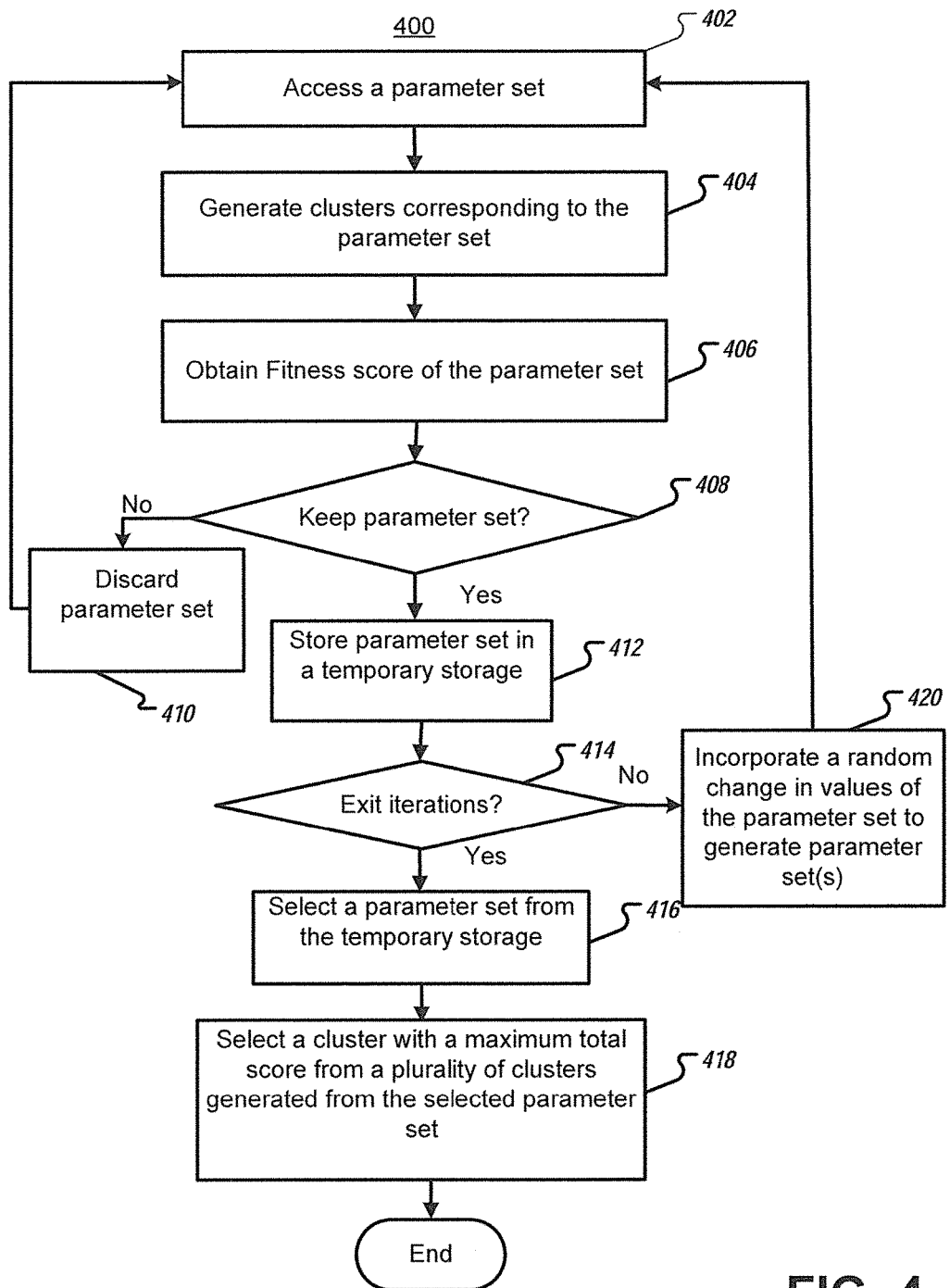
FIG. 4 illustrates one example of a method of hyper-optimizing a cluster engine through parameter set determination.

FIG. 4 shows a flowchart 400 that details one example of determining a parameter set for clustering. The method begins at 402 wherein parameter sets for a dataset are accessed. To begin a single cycle of clustering, a large number of parameters are accessed regardless of the size of the dataset. When the clustering cycle is initially commenced, the parameters are generally left at their default values as manual configuration of the parameters is challenging. As a result, the full breadth of the parameter space is not explored under manual configuration and non-intuitive clusters get prematurely discarded. Accordingly, the method 400 details the steps for hyper-optimization of the clustering engine 100 which permits discovery of non-intuitive clusters.

At step 404, a plurality of cluster solutions corresponding to the parameter set accessed at 402 are generated. In one example, the cluster module 130 may be designed to cluster structured data and to search for clusters that are well separated in terms of the attributes of the data being clustered. For example, attributes may be identified as suitable for measuring the fitness of a particular clustered solution. These attributes can be referred to as drivers 102 for a given dataset and are specified at the outset. A typical example of a driver in a commercial situation might be profit, or revenue per square foot, or number of sales, or brand affinity and can be referred to as a 'business' driver. There may be multiple drivers and these drivers are attributes associated with the data (e.g., quantities that have been measured for each item in the database). Other drivers, also specified at the outset by the client or the analyst, could comprise attributes such as demographics, attitudes and perceived value which are referred to as 'solution diversity' drivers. Clustered datasets which have a high fitness score have clusters which are differentiated across the drivers. Continuing with the commercial example, separation of the clusters along the business drivers enables identification of the best and worst performing clusters according to business objectives, while the separation of the clusters along the solution diversity drivers aids merchandising and messaging strategies.

The cluster solutions generated at 404 are evaluated at 406 to obtain a Fitness score for the parameter set. Generally, the separation between the clusters may be determined in terms of three independent scores for a given solution: a value score, a solution diversity score and an average centroid distance score. The value score may be defined to be the average inter-centroid distance between clusters in the business variable directions. The second score, solution diversity, may be defined as the average inter-centroid distance in the solution diversity variable directions. The third score, the average centroid distance score, may be defined as the average intra-centroid distance in the clustering dimension directions. These three scores are combined together in a weighted sum to produce the total score, and the clusters produced by the cluster module 130 are ranked by their total score. A given parameter set can produce thousands of cluster solutions. Each cluster solution can be evaluated based on its total score. Some cluster solutions are accepted by the cluster module 130 while other cluster solutions may be rejected. An average of the total scores of the upper quartile of cluster solutions accepted by the cluster module 130 can be used as the Fitness score of a given parameter set.

At 408, a determination is made as to whether to keep the parameter set based on the Fitness score. The determination may be made, according to an example, by comparing the fitness score determined at 406 with a fitness score of at least one previously generated parameter set. The parameter set with the highest fitness score is kept, or a sample of K parameter sets is chosen, where K is an integer greater than 1, and the selection of the sample is weighted by relative fitness scores so that "fitter" parameter sets are more likely to be chosen. If the determination is not to keep the parameter set, the, the parameter set is discarded at 410. For example, if a determination is made at 408 not to keep the parameter set, the parameter set determined at 406 is not used to determine whether to exit the iterations, and thus is also not used to generate clusters at 418 or is not modified at 420 to generate one or more new parameter sets. All parameter sets that are ultimately not used to generate clusters at 418 may be discarded and not just the parameter sets that are determined not to be kept at 408. For example, after a parameter set is used to generate new parameters sets using the GA or PSO, the parameter set may be discarded, which may include deletion from storage (e.g., temporary storage).

If at 408, it is decided to keep the parameter set, the parameter set is stored, for example, in a temporary storage or a cache at step 412. At 414, it is determined if a condition to exit (referred to as the exit condition) the generation of parameter sets is met. In an example, the condition may include determining whether the Fitness score has stabilized. Stabilization may be determined based on the difference between the Fitness score of the current parameter set and a previous parameter set. If the difference is less than a threshold then the Fitness score may be considered to be stable, or if the Fitness score difference is determined to be less than a threshold for a predetermined number of iterations, then the Fitness score may be considered to be stable. In another example, the exit condition may be a predetermined number of iterations. If the generation of parameter sets has reached the predetermined number of iterations, then the generation of parameter sets is stopped. If it is determined at 414 that the exit condition is met, a parameter set which has a high Fitness score (which may be the last parameter set that was generated) is selected at 416. The cluster solution with the highest Fitness score (e.g., maximum total score) may be cluster solution selected at 418 for further processing, for example, by the output module 150. If multiple parameter sets with equally high Fitness scores or Fitness scores that are close in value are identified, their corresponding parameter sets are used to generate cluster solutions. The cluster solutions can be presented to a user who may then select one of the high scoring cluster solutions and its respective parameter set to be used with the output module 140.

If it is determined at 414 that the exit condition is not met, a random change is incorporated in at least one of the values of a parameter set at 420 to generate another parameter set. The change may be incorporated using the GA or a PSO algorithm. In an example regarding the GA, the change can be incorporated via the mutation module 230 and crossover module 240 of the parameter generation module 124. In an example regarding the PSO algorithm, the change in the parameter values can be incorporated via distance module 310, movement module 320 and perturbation module 330 of the parameter generation module 124. The change or changes may generate multiple children parameter sets, and the parent parameter sets may be discarded after the children parameter sets are generated. The method returns to 402 for accessing the generated parameter set(s) which has the changed parameter values incorporated therein. The steps are repeated as described above until the exit condition is met at 414.

Figure 5:
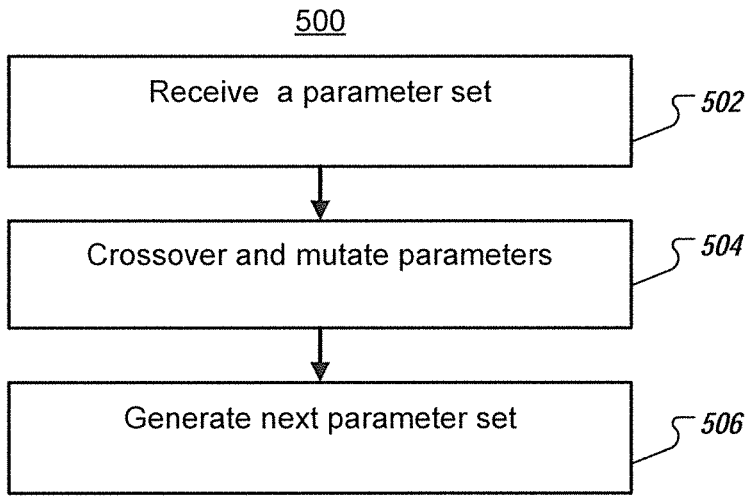
FIG. 5 illustrates one example of a method of generating parameter sets.

FIG. 5 shows a flowchart 500 detailing an example of a method of generating parameter sets. The method 500 may be used in the method 400. For example, if the parameter set is discarded at 410, a new parameter set may be determined according to the method 500. Various computing techniques such as GA or PSO algorithms can be employed for generating further parameter sets. A parameter set may include randomly selected default values initially selected at 502 at the beginning of a cluster cycle. At 504, the parameters are processed by the crossover and mutation operators. As mentioned earlier, the GA algorithm is generally applied to Boolean values. However, the GA algorithm is extended as described below to also process numerical and categorical type values. The mutation operator for a numeric parameter is defined as perturbing the parameter value by a random change of up to 5%. Categorical parameters are resampled while Boolean parameters are toggled. The crossover operator swaps the parameters of two parameter sets after a randomly chosen point. At 506, the next parameter set is obtained from the parameter set initially selected at 502.

Figure 6:
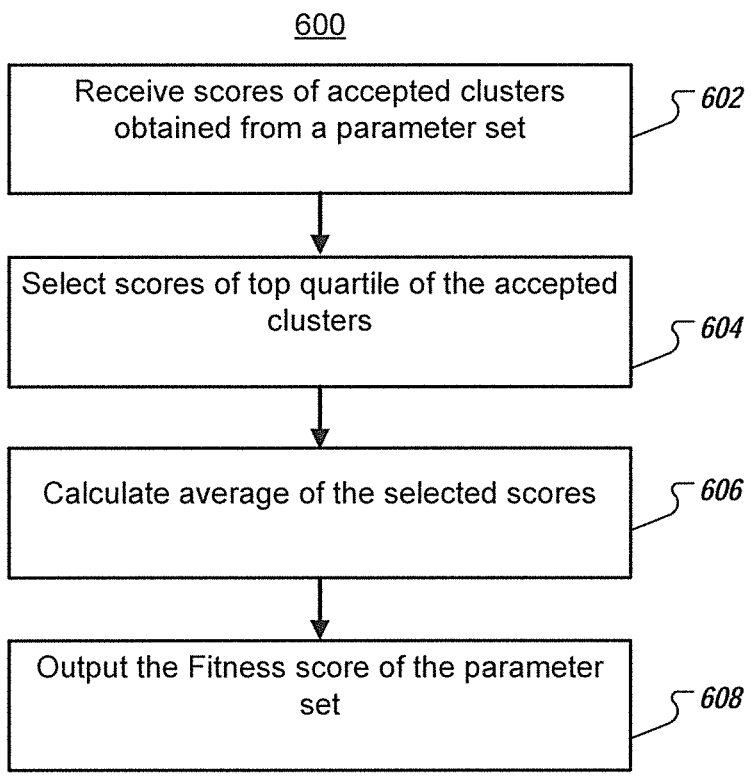
FIG. 6 illustrates one example of a method of obtaining a Fitness score.

FIG. 6 shows a flowchart 600 that details one example of a method of obtaining the Fitness score for a parameter set. The Fitness score may be used in the method 400 as discussed above. When a cluster cycle is run, thousands of cluster solutions may be produced. A total score which is the sum of the business value score, the solution diversity score and the average centroid distance score is calculated for each cluster solution. As thousands of cluster solutions are produced in each clustering cycle, the cluster solutions may or may not be accepted by the clustering engine 100. Clustering solutions are accepted or rejected based on their respective total scores. Hence, at 602 the scores of accepted cluster solutions for a given parameter set are obtained. At 604, the scores of the top quartile of the accepted cluster solutions are selected. The average of the selected scores is calculated at 606 and output as the Fitness score of the parameter set at 608.

FIG. 7 illustrates a table 700 which shows one non-limiting example of parameters, along with their constraints, which may be used in the parameter sets discussed above. Often the number of clusters to be considered is bounded. For example, the cost of a store improvement program can be limited by limiting the number of target store clusters (and hence the number of programs) under consideration. The number of allowed clusters can be restricted to lie between these pre-specified limits by specifying the min_cluster and max_cluster parameters. As another example, the number of clustering dimensions is bounded by the min_vars and max_vars parameters. The hyper-optimized clustering engine 100 selects a parameter set for generating a cluster solution by exploring various parameter sets subject to constraints as specified above.

Figure 8:
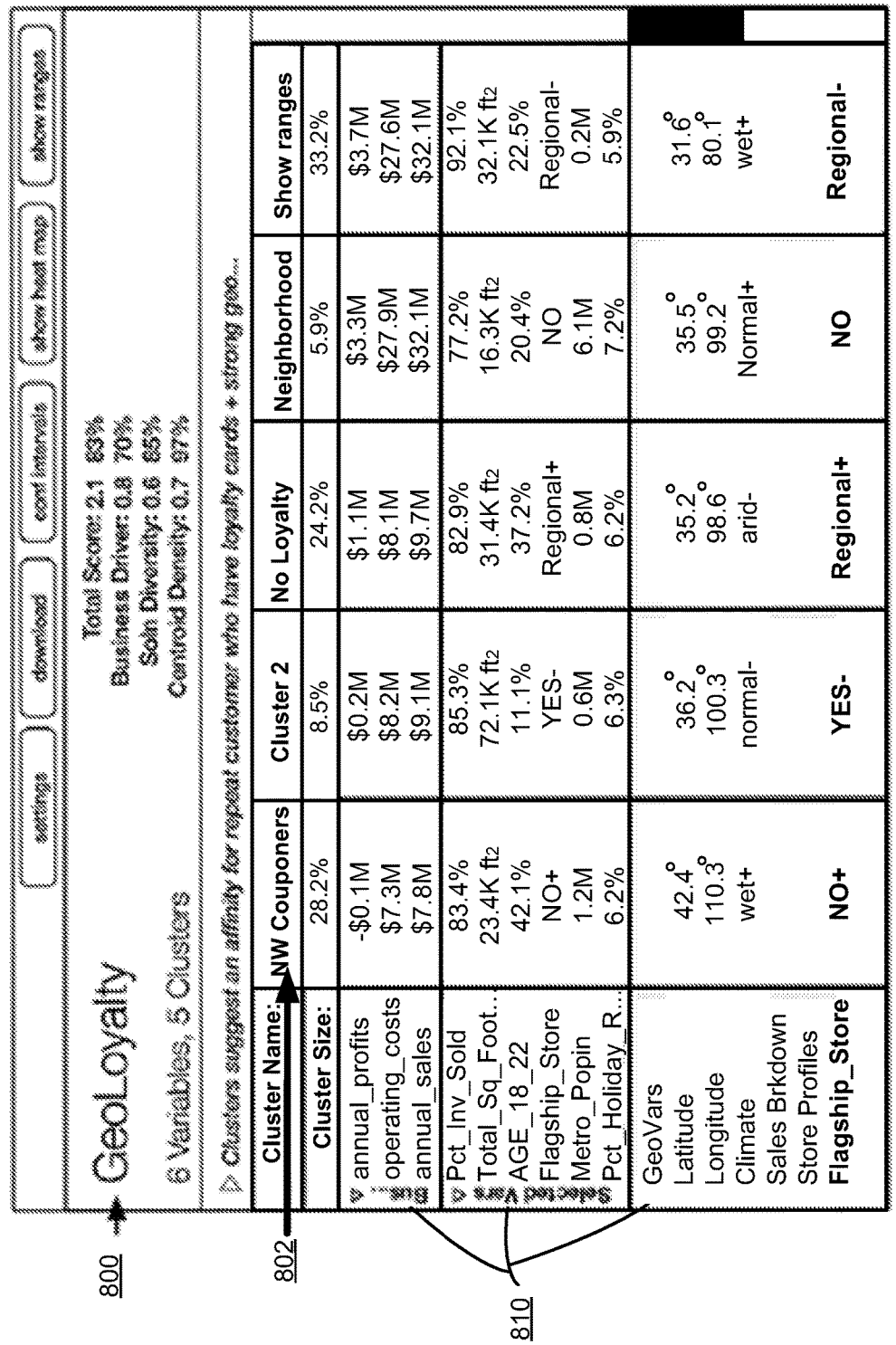
FIG. 8 illustrates an example of a user interface displaying a cluster and related score.

Cluster solutions may be analyzed to identify a combination of non-obvious attributes of each cluster, such as geographic location and one or more other attributes such as shopping behaviors. For example, FIG. 8 may be an example of a cluster solution 800 from one run of the hyper-optimized clustering engine 100. This run would have produced many other cluster solutions that would look somewhat similar and are not shown here. The cluster solution 800 shown in FIG. 8 is acceptable as the total score is around the 83rd percentile. Moreover, the cluster solution 800 is well differentiated across business and solution diversity drivers because the scores in these areas are relatively high as the business score 806 is on the 70$^{th}$ percentile and solution diversity score 808 is on the 85$^{th}$ percentile. Given a cluster solution like this, an analyst may categorize the clusters to give them meaning in the marketing context. So the clusters 1, 3, 4 and 5 have been renamed as shown at 802 to reflect a meaning or category determined for each of the clusters. For example, NW couponers may indicate that a shopping pattern associated with coupons exists that is particular to shoppers from the north west region. The identification of combinations of non-obvious attributes can be used to control an external system. For example, instructions are sent to a content delivery system to digitally send electronic coupons over a network to customers in the north west region. Also, parameters are shown at 810 and as seen from FIG. 8, they take various values including Boolean values, numerical values, string and the like.

Figure 9:
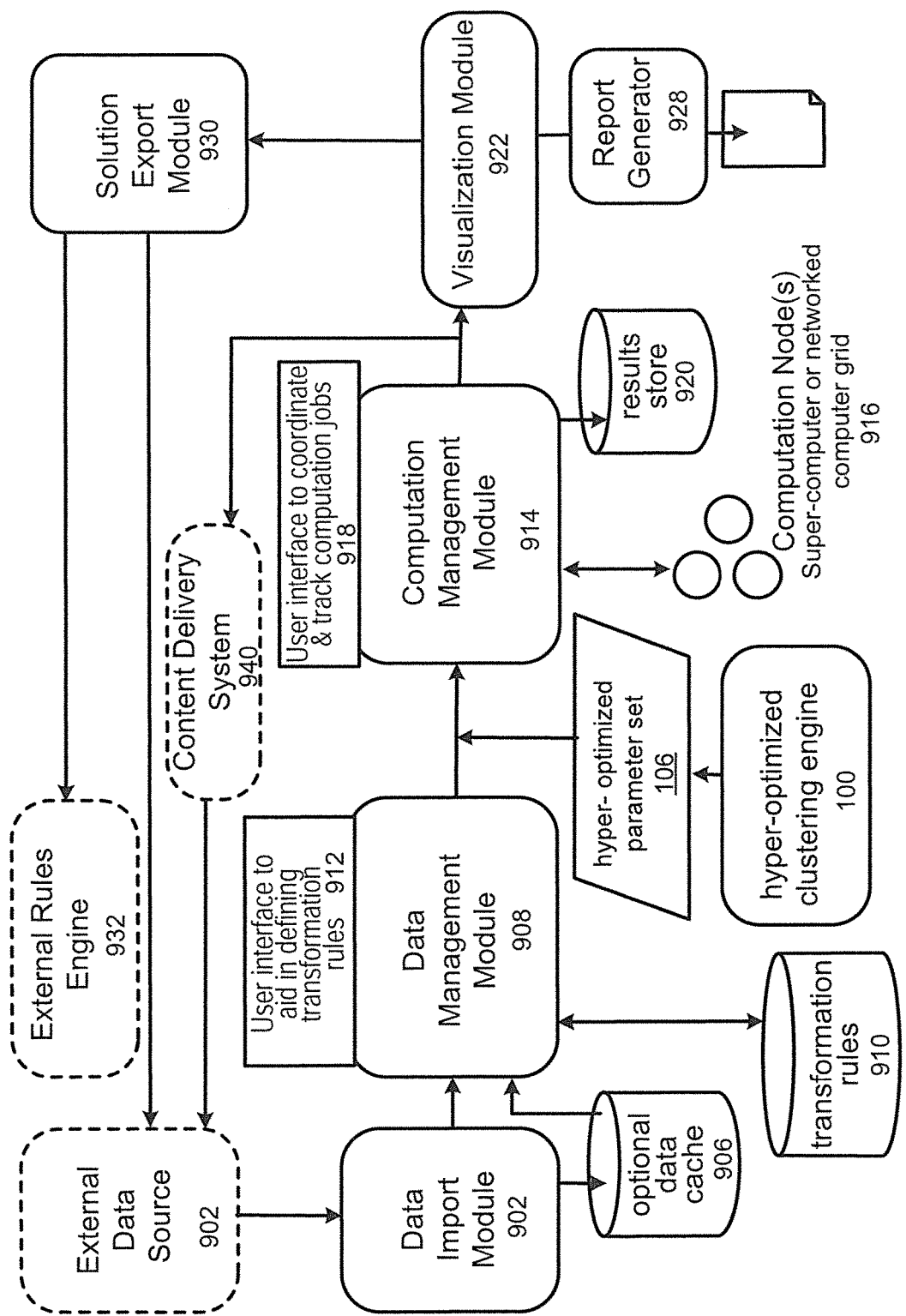
FIG. 9 illustrates an example of components included in a clustering system.

FIG. 9 illustrates an example of components of a clustering system 900. The clustering system 900 in FIG. 9 may be implemented in a distributed manner across multiple devices and systems (e.g., personal devices such as smartphones, laptops, or server computers), or some (or all) components may be installed on the same device. Components on separate devices may use any suitable communications technique to transmit data (represented by the arrows) between one another. For example, in an implementation, the clustering system 900 may be implemented as a distributed computing platform that coordinates the search and discovery of high-value segmentation strategies in data sets with large numbers of variables. In an example, the clustering system 900 can be the output module 140 shown in FIG. 1 which receives the hyper-optimized parameter set 106 to generate a hyper-optimized cluster solution 108.

In the example of FIG. 9, data may be accessed from a data source 902 by data import module 904. The data import module 904 may optionally store some or all (or none) of the data in a local data cache 906. The imported data may then be passed to a data management module 908 for processing prior to clustering. For example, the data management module 908 may organize the data by grouping, ordering, transforming, and/or "cleaning" the data in such a way that facilitates input of the data into clustering processes. The data management module 908 may use one or more transformation rules that specify one or more rules to apply to the data for processing. In some implementations, the transformation rules may be accessed from storage (e.g., from data store 910). Additionally or alternatively, the transformation rules may be input by a user. For example, the data management module 908 may provide a user interface 912 to a user that enables the user to specify one or more transformation rules.

The data management module 908 may identify different types of variables that are specified by the user, and separate the variables according to the identified type. Some types of variables may be used as inputs to the clustering process, while other types of variables may be used evaluation criteria to evaluate the resulting cluster solutions. As such, the system may enable not only automated clustering of data, but also automated evaluation of the resulting cluster solutions. For example, the system may separate variables in the data across three distinct types: Target Drivers, Cluster Candidates, and Profile Variables. Target Drivers are factors that are for driving the success of a business, such as revenue, profitability, potential value of a customer, costs, etc. In some cases, there may be no more than two or three target drivers. Cluster Candidates are attributes that are readily available that may be used to partition the overall population. These may describe the population and may be significantly different from the business drivers. Profile Variables are other factors that are not assigned as cluster candidates or target drivers. Profile variables may not be immediately actionable (the data may not be easily accessible or may be found only after a period of time) or they may be too much of a restatement of the business drivers.

The variables determined by the data management module 908 and the hyper-optimized parameter set 106 generated by the hyper-optimized clustering engine 100 are provided to the computation management module 914. The computation management module 914 may send the processed data including the hyper-optimized parameter set 106 and one or more chosen clustering algorithms to one or more computational nodes 916 to perform clustering operations. The clustering operations may identify several (e.g., thousands or millions) different cluster solutions, each including a plurality of clusters of the data.

The computation management module 914 may evaluate generated cluster solutions based on user-specified criteria, and iterate through multiple sets of cluster solutions to identify cluster solutions that satisfy the criteria. The computation management module 914 may identify also apply one or more generalized heuristic supervised learning algorithms to the computation process to improve the efficiency of the solution search, based on the cluster solutions generated by the computational nodes 916. The supervised learning algorithms may utilize target driver variables specified by the user to facilitate searching for particular cluster solution(s), among the potentially many cluster solutions generated by the computation nodes 916, that are meaningful to the user. As an example, the heuristic optimization algorithm may be an adaptation of Simulated Annealing. The computation management module 914 may also provide a user interface 918 that shows the user the progress of the clustering and shows cluster solutions.

The computation management module 914 may also provide a user interface that shows the user the progress of the clustering and shows cluster solutions. The user interface may include visualization module 922 which shows cluster solution(s) and other information pertaining to the cluster solutions. A report generator 928 generates report regarding the cluster solutions.

In some implementations, the visualization module 922 may also provide the cluster solution(s) and/or evaluation results to a solution export module 930. The solution export module 930 may then provide feedback information to the clustering system 900 or other systems. For example, the solution export module 930 may provide feedback information to an external rules engine 932, which may, for example, use the feedback information to adapt one or more transformation rules. Additionally or alternatively, the solution export module 930 may feedback information to the external data source 902, for example, to adjust one or more variables or attributes in the data.

For example, the solution export module 930 may be configured to export information regarding a cluster solution to different types of external databases and external systems, and facilitate the implementation of the cluster solution by the external systems. In some implementations, the solution export module 930 may be configured to export one or more rules or algorithms for clustering data, based on the cluster solution that was generated. The rules or algorithms may enable external systems to apply those rules or algorithms to implement the generated cluster solution to various types of data stored on the external database. In some implementations, the system may obtain data from the external system, retune the cluster solution based on the received data (such as changing variable selection), and send information regarding a revised cluster solution to the external system. As such, in some implementations, the clustering system 900 may enable more than just an analytics tool, but also enable a feedback-based and connected enterprise system.

The visualization module 922 may then provide the resulting cluster solution(s) and results of the evaluation to a report generator 928, which generates a report to be output to the user. The report may include various types of information regarding the evaluation of the cluster solution(s), and may enable a user to adjust one or more variables of the clustering system 900 to fine-tune the clustering operations.

In some implementations, the visualization module 922 may also provide the cluster solution(s) and/or evaluation results to a solution export module 930. The solution export module 930 may then provide feedback information to the clustering system 900 or other systems. For example, the solution export module 930 may provide feedback information to an external rules engine 932, which may, for example, use the feedback information to adapt one or more transformation rules. Additionally or alternatively, the solution export module 930 may feedback information to the external data source 902, for example, to adjust one or more variables or attributes in the data.

For example, the solution export module 930 may be configured to export information regarding a cluster solution to different types of external databases and external systems, and facilitate the implementation of the cluster solution by the external systems. In some implementations, the solution export module 930 may be configured to export one or more rules or algorithms for clustering data, based on the cluster solution that was generated. The rules or algorithms may enable external systems to apply those rules or algorithms to implement the generated cluster solution to various types of data stored on the external database. In some implementations, the clustering system 900 may obtain data from the external system, retune the cluster solution based on the received data, and send information regarding a revised cluster solution to the external system. As such, in some implementations, the system may enable more than just an analytics tool, but also enable a feedback-based and connected enterprise system.

As a particular example, for a data set of 10,000 customers with voluminous data (e.g., from a customer survey), the clustering system 900 may select some subset of variables from that data set (e.g. 5 variables) and generate a cluster solution that divides those 10,000 customers into 4 different groups. For example, cluster A may include "high-value" customers that generate a majority of the company's profits, such that the company may want to ensure maintaining its marketing budget for those customers; cluster B may include "moderate-value" customers; cluster C may include "low-value" customers that generate very little profits and may even cost the company money; and cluster D may include "prospective" customers that represent opportunity for new sales, such that the company may want to market to them more aggressively.

Now consider a scenario in which, after those 10,000 customers have been assigned to four clusters, the company wants to organize and cluster another 1 million customers into the four cluster groups. The system may be configured to export a solution, e.g., as a basic algorithm, that the company's computer systems may be able to use to assign new customer records to the four cluster groups. As illustrative examples, the exported solution may be in the form of a special SQL function that can be processed by the company's customer database, or a Hadoop Map-Reduce algorithm that can similarly be processed on the company's BigData Hadoop cluster, etc. In some implementations, the exported solution may enable the company to implement the cluster solution in a manner that is independent of system that generated the cluster solution, such that the company can easily implement the cluster solution locally within its own systems. In some implementations, the exported solution may only need as input the selected subset of variables (e.g., 5 variables in the example above) that were used in the cluster solution computation.

By providing a composite technique of cluster generation and cluster evaluation, the clustering system 900 enables the user to analyze the details and nuances of many (e.g., dozens of) solutions at the same time, rather than individually analyzing one solution at a time to see if each solution is appropriate. The clustering system 900 may therefore enable a user to explore a large number (e.g., millions) of cluster solutions efficiently in less time than it would take a typical practitioner to evaluate fewer (e.g., a couple dozen) cluster solutions.

In an implementation, the system may include an external system, such as content delivery system 940, that is controlled based on a selected cluster solution. For example, instructions are sent to the content delivery system 940 based on attributes determined for clusters in the selected cluster solution. As described with respect to FIG. 8, in an example, attributes are identified for a cluster that are associated with NW couponers, which may indicate that a shopping pattern associated with coupons exists that is particular to shoppers from the north west region. The computation management module 914 or another module not shown can send instructions to the content delivery system 940 to digitally send electronic coupons over a network to customers in the north west region. In an example, the content delivery system 940 may include a contact resource management system, such as provided by Salesforce.com®, Infusionsoft®, Microsoft Dynamics®, etc., which automatically targets customers. For example, data in a database that is associated with customers in the north region is queried and for each customer customized emails or coupons are automatically sent. The content delivery system 940 may have the flexibility to send emails and coupons with a time-interval of hours, days, weeks, etc. and also has an option to trigger sending through the instructions. The external data source 902 may capture online behaviors of the targeted customers to determine whether the coupons are being used for purchases and to provide feedback for future clustering.

In some implementations, the user interfaces 912, 918, and 922 may be custom-designed user interfaces that facilitate some portion of the overall activity and, in some cases, may be used by multiple users with different roles. As such a clustering and evaluation system 900 according to the present disclosure may coordinate and facilitate a distributed process of cluster generation and evaluation, and streamline the tasks and roles that potentially involve the participation of multiple people.

Figure 10:
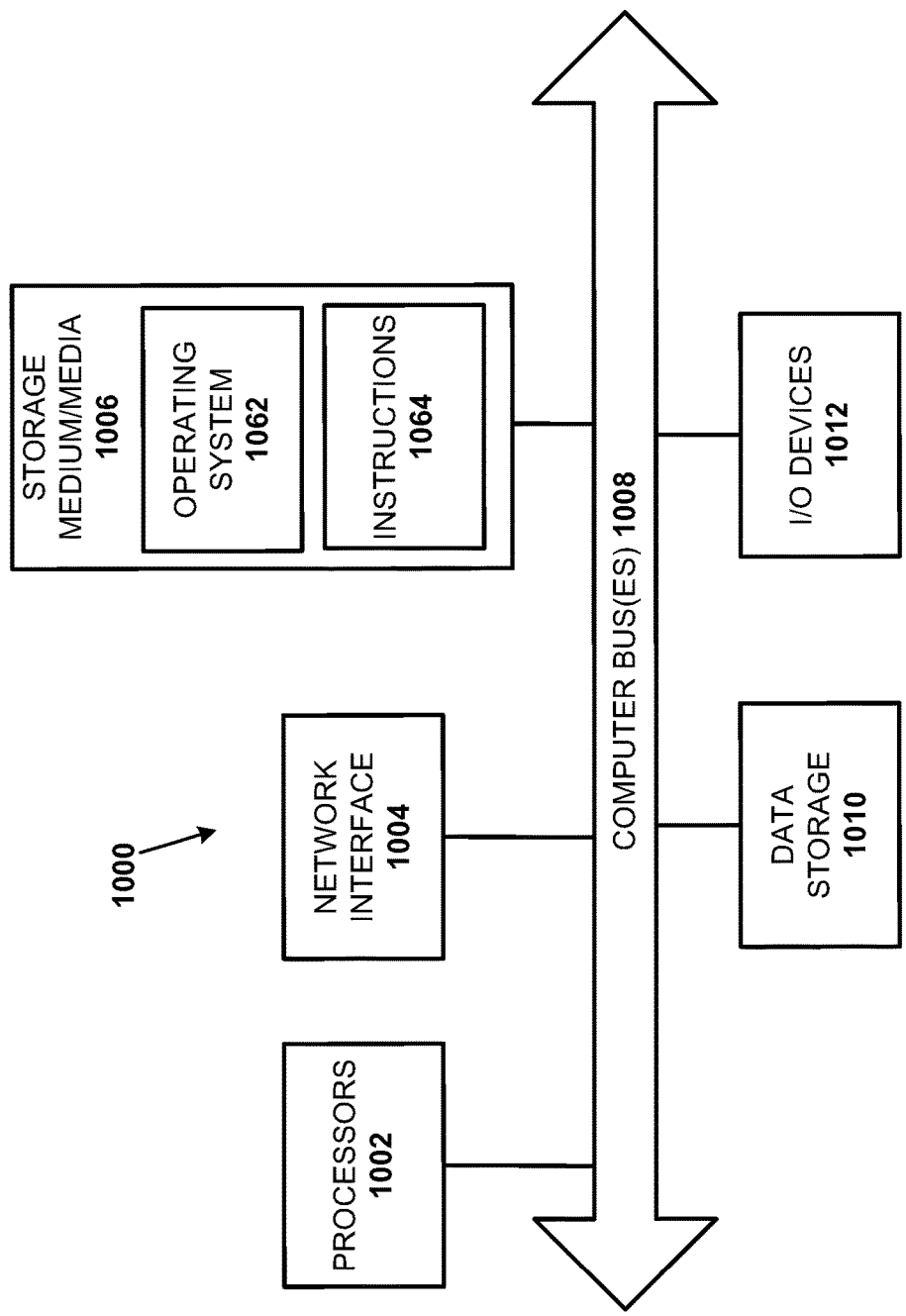
FIG. 10 illustrates an example of a computer platform.

FIG. 10 illustrates a computer system 1000 that may be used to implement the hyper-optimized clustering engine 100. The computer system 1000 may include additional components not shown and that some of the components described may be removed and/or modified. The computer system 1000 may be a server or the system 100 may be implemented in a distributed computing system on a plurality of servers. Each server may include the components of the computer system 1000.

The computer system 1000 includes processor(s) 1002, such as a central processing unit, ASIC or other type of processing circuit, input/output devices 1012, such as a display, mouse keyboard, etc., a network interface 1004, such as a Local Area Network (LAN), a wireless 802.11x LAN, a 3G or 4G mobile WAN or a WiMax WAN, and a computer-readable medium 1006. Each of these components may be operatively coupled to a bus 1008. The computer readable medium 1006 may be any suitable medium which participates in providing instructions to the processor(s) 1002 for execution. For example, the computer readable medium 1006 may be non-transitory or non-volatile medium, such as a magnetic disk or solid-state non-volatile memory or volatile medium such as RAM. The instructions or modules stored on the computer readable medium 1006 may include machine readable instructions 1064 executed by the processor(s) 1002 to perform the methods and functions of the hyper-optimized clustering engine 100 or the clustering system 900.

The hyper-optimized clustering engine 100 or the clustering system 900 may be implemented as software stored on a non-transitory computer readable medium and executed by one or more processors. For example, the computer readable medium 1006 may store an operating system 1062, such as MAC OS, MS WINDOWS, UNIX, or LINUX, and code 1064 for the core system 100. The operating system 1062 may be multi-user, multiprocessing, multitasking, multithreading, real-time and the like. For example, during runtime, the operating system 1062 is running and the code for the hyper-optimized clustering engine 100 or the clustering system 900 is executed by the processor(s) 1002.

The computer system 1000 may include a data storage 1010, which may include non-volatile data storage. The data storage 1010 stores any data used by the system 100. The data storage 1010 may be used to store dataset 102, 108 parameter sets 104, 106 and may be hosted by separate database servers.

The network interface 1004 connects the computer system 1000 to internal systems for example, via a LAN. Also, the network interface 1004 may connect the computer system 1000 to the Internet. For example, the computer system 1000 may connect to web browsers and other external applications and systems via the network interface 1004.

What is claimed is:

1. A clustering cycle optimization system comprising:
    a data storage to store parameters for clustering a data set; and
    one or more processors to perform operations to:
        generate an initial parameter set of a plurality of parameter sets via random selection of parameter values, the initial parameter set including different types of parameters;
        cause random changes in values of the different types of parameters in the initial parameter set, wherein the random changes include changes of a predetermined percentage caused in the values of numerical parameters, toggling Boolean parameters and resampling categorical parameters;
        generate the plurality of parameter sets based on the random changes
        generate a plurality of cluster solutions from each of the plurality of parameter sets, the plurality of cluster solutions generated for each parameter set comprising an optimized cluster solution having a highest total score of the plurality of cluster solutions generated for the parameter set;
        obtain a respective fitness score for each parameter set of the plurality of parameter sets, the respective fitness score of the parameter set being based on total scores of the plurality of cluster solutions generated for the parameter set;
        select a hyper-optimized parameter set from the plurality of parameter sets based on a comparison of the respective fitness scores of the plurality of parameter sets;
        select a hyper-optimized cluster solution from the plurality of cluster solutions generated from the hyper-optimized parameter set, the selection of the hyper-optimized cluster solution being based on comparisons of the total scores of the plurality of cluster solutions generated for the hyper-optimized parameter set; and
        perform an actionable item that includes transmission of a communication by an external system to a group of users based on the hyper-optimized cluster solution.

2. The clustering cycle optimization system of claim 1, wherein the predetermined percentage is 5%.

3. The clustering cycle optimization system of claim 1, wherein the system comprises:
    a crossover operator that randomly swaps parameters between two of the plurality of parameter sets.

4. The clustering cycle optimization system of claim 1, wherein the hyper-optimized parameter set has a high fitness score relative to fitness scores of other parameter sets of the plurality of parameter sets.

5. The clustering cycle optimization system of claim 4, wherein the hyper-optimized cluster solution has a maximum total score of the plurality of cluster solutions associated with the hyper-optimized parameter set.

6. The clustering cycle optimization system of claim 4, wherein the fitness score of a current parameter set is an average of total scores of upper quartile subset of the plurality of cluster solutions.

7. The clustering cycle optimization system of claim 1, wherein the hyper-optimized cluster solution includes clusters of data that each have attributes for determining the actionable item.

8. A computer implemented method for hyper-optimizing a clustering engine, comprising:
    generating an initial parameter set of a plurality of parameter sets via random selection of parameter values, the initial parameter set including different types of parameters;
    causing random changes in values of the different types of parameters in the initial parameter set, wherein the random changes include changes of a predetermined percentage caused in the values of numerical parameters, toggling Boolean parameters and resampling categorical parameters;
    generating the plurality of parameter sets based on the random changes;
    generating a plurality of cluster solutions from each of the plurality of parameter sets, the plurality of cluster solutions generated for each parameter set comprising an optimized cluster solution having a highest total score of the plurality of cluster solutions generated for the parameter set;
    obtaining a respective fitness score for each parameter set of the plurality of parameter sets, the respective fitness score of the parameter set being based on total scores of the plurality of cluster solutions generated for the parameter set;

selecting a hyper-optimized parameter set from the plurality of parameter sets based on a comparison of the respective fitness scores of the plurality of parameter sets;

selecting a hyper-optimized cluster solution from the plurality of cluster solutions generated from the hyper-optimized parameter set, the selection of the hyper-optimized cluster solution being based on comparisons of the total scores of the plurality of cluster solutions generated for the hyper-optimized parameter set; and performing an actionable item that includes transmission of a communication by an external system to a group of users based on the hyper-optimized cluster solution.

9. The method of claim 8, wherein obtaining the fitness score further comprises:

selecting an upper quartile of total scores of the plurality of cluster solutions; and calculating an average of the upper quartile total scores.

10. The method of claim 8, further comprising:

calculating respective total scores for the plurality of cluster solutions wherein each respective total score is a sum of a business value score, a solution diversity score and an average centroid distance score.

11. The method of claim 8, wherein a dataset associated with the plurality of parameter sets represents stores and the actionable item further comprises:

selecting a subset of the stores for upgrades.

12. A non-transitory computer readable medium including machine readable instructions that are executable by at least one processor to:

generate an initial parameter set of a plurality of parameter sets via random selection of parameter values, the initial parameter set including different types of parameters;

cause random changes in values of the different types of parameters in the initial parameter set, wherein the random changes include changes of a predetermined percentage caused in the values of numerical parameters, toggling Boolean parameters and resampling categorical parameters;

generate the plurality of parameter sets based on the random changes;

generate a plurality of cluster solutions from each of the plurality of parameter sets, the plurality of cluster solutions generated for each parameter set comprising an optimized cluster solution having a highest total score of the plurality of cluster solutions generated for the parameter set;

obtain a respective fitness score for each parameter set of the plurality of parameter sets, the respective fitness score of the parameter set being based on total scores of the plurality of cluster solutions generated for the parameter set;

select a hyper-optimized parameter set from the plurality of parameter sets based on a comparison of the respective fitness scores of the plurality of parameter sets;

select a hyper-optimized cluster solution from the plurality of cluster solutions generated from the hyper-optimized parameter set, the selection of the hyper-optimized cluster solution being based on comparisons of the total scores of the plurality of cluster solutions generated for the hyper-optimized parameter set; and perform an actionable item that includes transmission of a communication by an external system to a group of users based on the hyper-optimized cluster solution.

* * * * *